US011409130B1

(12) United States Patent
Jeong et al.

(10) Patent No.: US 11,409,130 B1
(45) Date of Patent: Aug. 9, 2022

(54) SPRING HINGE WITH ACCOMMODATION FOR FLEXIBLE PRINTED CIRCUIT

(71) Applicant: AMAZON TECHNOLOGIES, INC., Seattle, WA (US)

(72) Inventors: Chun Sik Jeong, Los Gatos, CA (US); Jung Sik Yang, Cupertino, CA (US); Niranjan Madan Mohan Bhatia, San Jose, CA (US); Yuna Hu, Cupertino, CA (US); Jianchun Dong, Palo Alto, CA (US); Zhen Xu, Santa Clara, CA (US); Han Zhang, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 411 days.

(21) Appl. No.: 15/912,127

(22) Filed: Mar. 5, 2018

(51) Int. Cl.
  *G02C 5/22* (2006.01)
  *G02C 11/00* (2006.01)
  *G02B 27/01* (2006.01)
  *G02C 5/14* (2006.01)
  *G02C 13/00* (2006.01)

(52) U.S. Cl.
  CPC ............. *G02C 5/22* (2013.01); *G02B 27/017* (2013.01); *G02C 5/146* (2013.01); *G02C 11/10* (2013.01); *G02C 13/001* (2013.01)

(58) Field of Classification Search
  CPC .. G02B 5/2227; G02B 5/2236; G02B 2/2254; G02B 2/2263; G02B 2/2272
  See application file for complete search history.

(56) References Cited

U.S. PATENT DOCUMENTS

| 8,766,940 | B1 | 7/2014 | Starner et al. | |
|---|---|---|---|---|
| 9,482,882 | B1 | 11/2016 | Hanover et al. | |
| 2015/0212553 | A1* | 7/2015 | Park | G06F 1/1615 361/679.27 |
| 2016/0048036 | A1* | 2/2016 | Cazalet | G02C 5/2236 16/228 |
| 2016/0090767 | A1* | 3/2016 | Park | E05D 11/1064 16/319 |

* cited by examiner

*Primary Examiner* — Christopher Stanford
*Assistant Examiner* — Journey F Sumlar
(74) *Attorney, Agent, or Firm* — Lindauer Law, PLLC

(57) ABSTRACT

A head-mounted wearable device (HMWD) with a form factor of eyeglasses incorporates hinges between a front frame and temples. The hinges provide a fully enclosed passage for a flexible printed circuit (FPC). The FPC allows electrical connectivity between devices in the front frame and in the temple. The hinge includes a cam device that provides a biasing force that allows the temples to remain in one of four configurations: closed, transit, neutral, and maximum neutral. When in the transit configuration the biasing force provided by the cam device tends to move the temples towards the closed configuration. When in the maximum neutral configuration the biasing force provided by the cam device tends to move the temples towards the neutral configuration. During use, this biasing of the temples provides a gentle clamping force that assists in maintaining the HMWD on the user's head.

20 Claims, 9 Drawing Sheets

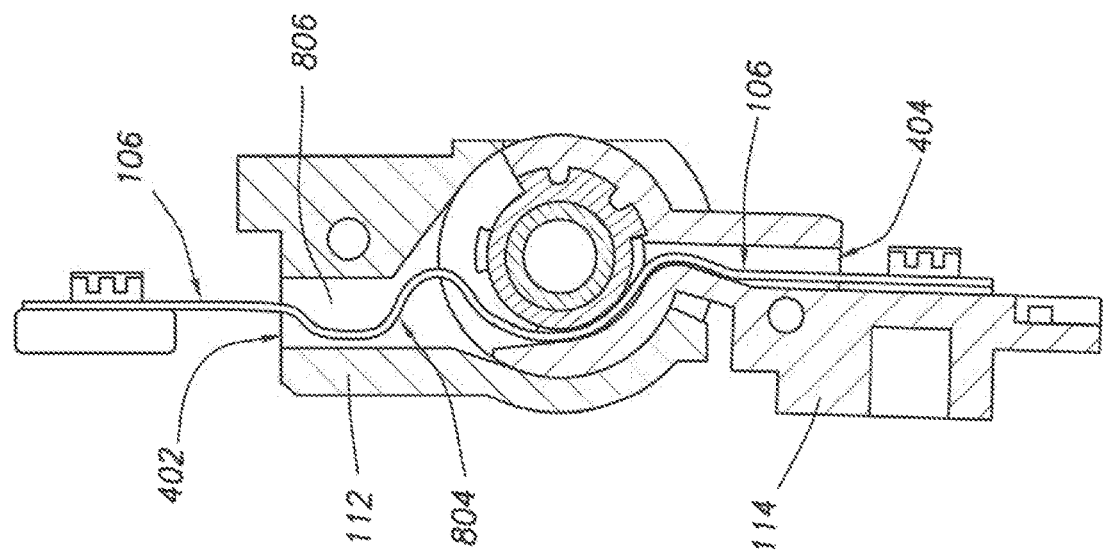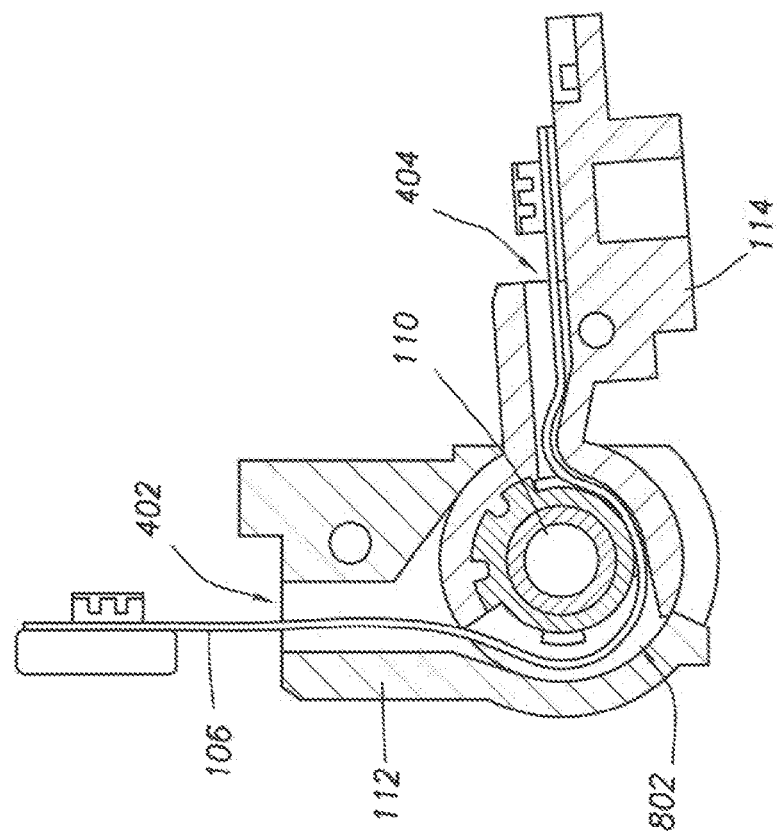

SPRING HINGE WITH ACCOMMODATION FOR FLEXIBLE PRINTED CIRCUIT

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8A depicts a cross sectional view of the hinge while in the closed configuration showing the path of the flexible printed circuit through the hinge, according to some implementations.

FIG. 8B depicts a cross sectional view of the hinge while in the neutral configuration showing the path of the flexible printed circuit through the hinge, according to some implementations.

Figure 1:
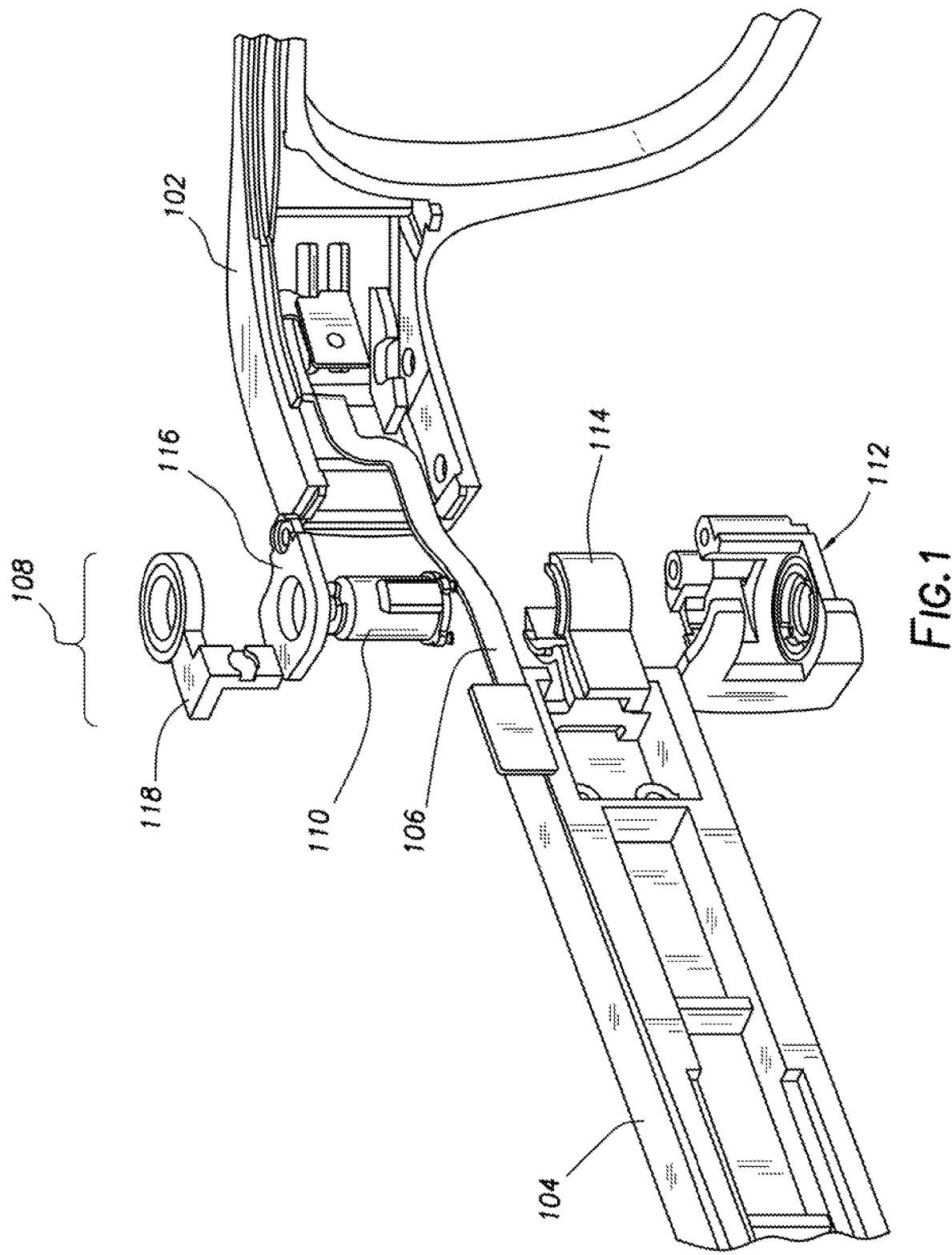
FIG. 1 depicts an exploded view of a hinge through which a flexible printed circuit passes and a cam device which during operation applies a biasing force to the hinge, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information. The HMWD may include one or more electronic devices. The HMWD may operate independently or be in communication with external computing devices during use. The HMWD may include input devices and output devices that provide a user interface to the user.

In one implementation in which the HMWD has the form factor of eyeglasses, the HMWD may include a front frame and a pair of temples. The front frame may comprise the portion of the HMWD that is worn near the user's eyes during use, while the temples extend alongside the user's head above the ears. A hinge may be used to join each temple to the front frame.

Described in this disclosure are devices that provide for a spring hinge that provides accommodation for connectivity between components on opposite sides of the hinge. The hinge and cam device described are volumetrically compact, suitable for use within the tight confines of a HMWD. The hinge provides mechanical support for rotation while the cam device provides for a biasing force on the hinge that conveys several benefits including stability and comfort of the HMWD during wear. The cam device may be inserted into, or built into, the hinge.

The hinge allows the attached temple to be rotated with respect to the front frame. For example, the temple may move between a closed configuration in which the temple is approximately parallel to the front frame or a neutral configuration in which the temple is approximately perpendicular to the front frame. The closed configuration may be used for storing the HMWD, such as when placing in a shirt pocket or carrying case. The neutral configuration may be used when the HMWD is being worn.

It is advantageous for the hinge to be biased, such that the temples will be retained in certain configurations. For example, it may be desired to have the temples remain in the closed configuration until manipulated by the user. In another example, it may be desired to have the temples remain in a neutral position corresponding to the temples being opened for normal wear to form an approximately 80 degree angle, relative to the front frame. In the other configurations, it may be desired for a biasing force to be applied that moves the temples. For example, a transit configuration may be desired that provides a biasing force that tends to close the temples when the angle of the temple is between the closed configuration and the neutral configuration. In another example, a maximum neutral configuration may be desired in which a biasing force is applied that tends to close the temples when the angle of the temple is greater than the neutral position.

During wear, the biasing force on the temples results in a force upon the head of the user in some circumstances. This force aids in retaining the HMWD on the user's head. This improves stability of the HMWD on the head and improves user comfort. The amount of applied force may be sufficient to prevent a "loose" feeling of the HMWD during wear, and may reduce the likelihood of the HMWD inadvertently becoming dislodged from the head.

The cam device may comprise a cam that has a surface and end stops. A cam follower is proximate to the cam device, and has a protrusion that extends to come into contact with the surface. A biasing mechanism, such as a spring, applies a force that pushes the cam follower, maintaining contact between the surface of the cam and the protrusion. The cam follower is able to rotate about a long axis that extends through a center of the cam and the cam follower. For example, as the cam follower rotates with respect to the surface of the cam, the protrusion slides across the surface. The cam is affixed to a first hinge portion, such that the cam will rotate in unison with motion by the first hinge portion. The cam follower is affixed to a second hinge portion, such that the cam follower will rotate in unison with motion by the second hinge portion.

The surface of the cam has a shape or profile that includes one or more curves and one or more recesses. By placing the curves and recesses in particular positions along the surface, different effects such as biasing or non-biasing forces may be applied to the hinge by the cam device. For example, a recess having concave walls will result in a condition where the biasing force tends to rotate the hinge into a position in which the protrusion is resting in the bottom of the recess. Likewise, a curved portion will result in the protrusion sliding "downhill" along the curve, rotating the cam follower. By varying the depth of one recess from another, the slope of the curve, and so forth, different levels of biasing force may be produced. For example, a first recess may have a first depth while a second recess may have a depth that is less than the first depth. Because of the lesser depth, while the protrusion is in the second recess, the spring providing the force on the cam follower is compressed more than when the protrusion is in the first recess. As a result, the biasing force produced by the interaction between the protrusion and the surface of the cam while in the second recess is greater than that produced while the protrusion is in the first recess.

The HMWD may include electronic devices in one or more of the temples or the front frame. Connections, such as electrical connections, optical waveguides, radio frequency waveguides, and so forth may be used to connect the electronic devices. For example, a computing device may be contained in the left temple while a microphone is located in the front frame and a battery located in the right temple. A flexible printed circuit may be used to provide connectivity between the temples and the front frame.

The hinge described in this disclosure provides a channel suitable for a connection to pass through the hinge. This channel fully encloses the flexible printed circuit (FPC), preventing exposure to the external environment. This improves reliability and durability. The hinge also provides a volume into which slack of the FPC may reside while the hinge is open.

By utilizing the devices and assemblies described, a HMWD may be constructed with a hinge that provides greater freedom of industrial design choices, improved user comfort, ability to facilitate interconnection of electronic devices on opposite sides of the hinge, improved mechanical reliability, and so forth.

Illustrative System

FIG. 1 depicts an exploded view of a portion of head-mounted wearable device (HMWD) in a general form factor of eyeglasses. The HMWD may include a front frame 102 and a temple 104, a portion of which is visible in this figure. During normal wear in which the HMWD is worn on a head of a user, the front frame 102 is proximate to the eyes of the user while left and right temples 104 extend away from the front frame 102 along the sides of the user's head.

The front frame 102 and the temple 104 may comprise cavities or spaces for various devices. Covers may be arranged to close or conceals those cavities or spaces. The inner cover may be affixed to the front frame 102 or the temple 104 by way of mechanical interference fit, fasteners, adhesives, and so forth.

Electronic components, devices, assemblies, and so forth may be affixed to, within, or incorporated into the front frame 102, temples 104, and so forth. For example, a computing device may be contained in the left temple 104 while a microphone is located in the front frame 102 and a battery located in the right temple 104. A flexible printed circuit (FPC) 106 may be used to provide connectivity between the components in the front frame 102 and the temples 104.

The FPC 106 may include one or more electrical conductors, optical waveguides, radio frequency waveguides, and so forth. For example, the FPC 106 may comprise a polymer base onto which electrical conductors, optical fibers, and so forth have been laminated.

The front frame 102 and the temple 104 are joined by a hinge 108. The hinge 108 includes at least one channel within which the FPC 106 is placed. Details of the passage of the FPC 106 are discussed in more detail below at least at FIGS. 8A and 8B.

Arranged within the hinge 108 is a cam device 110. The cam device 110 provides a biasing force that may vary based on rotational position. The cam device 110 may comprise a first portion and a second portion that are able to rotate relative to one another. Each portion of the cam device 110 may engage to a different part of the hinge 108 as described below. The cam device 110 may include one or more engagement features that are configured to engage complementary engagement features in the hinge 108 when installed. The cam device 110 is described in more detail below with regard to FIGS. 2 and 3.

The cam device 110 is depicted as a separate unit that may be inserted into the hinge 108 during assembly. In other implementations, the cam device 110 may be integrated into the hinge 108.

The hinge 108 may comprise a fixed arm 112. The fixed arm 112 is joined to the front frame 102. Unless otherwise stated, as used in this disclosure, one object may be joined to another using one or more of adhesives, welding, mechanical fasteners, interference fit, and so forth. In other implementations, the fixed arm 112 may comprise an integral part of the front frame 102. The fixed arm 112 may include one or more engagement features that mechanically engage a first portion of the cam device 110. Once engaged, the fixed arm 112 and the first portion of the cam device 110 will move in unison.

The hinge 108 may comprise a moving arm 114. The moving arm 114 is at least partially enclosed by the fixed arm 112. The fixed arm 112 is joined to the temple 104. In other implementations, the fixed arm 112 may comprise an integral part of the temple 104. The moving arm 114 may include one or more engagement features that mechanically engage a second portion of the cam device 110. Once engaged, the moving arm 114 and the second portion of the cam device 110 will move in unison.

The hinge 108 may include a fixed cover 116. The fixed cover 116 may join to the fixed arm 112 to retain the cam device 110 within the hinge 108.

The hinge 108 may include a moving cover 118. The moving cover 118 may join to one or more of the temple 104 or the moving arm 114.

The front frame 102 may enclose or otherwise support one or more lenses. The lenses may have specific refractive characteristics, such as in the case of prescription lenses. The lenses may be clear, tinted, photochromic, electrochromic, and so forth. For example, the lenses may comprise plano (non-prescription) tinted lenses to provide protection from the sun. In some implementations, only a single lens may be installed, or the lenses may be omitted.

The various components as described may comprise individual pieces, or may be integral to one another. The components may be formed from various materials, such as metal, plastic, ceramic, composite material, and so forth. For example, the front frame 102 may comprise 6061 aluminum alloy that has been milled to the desired shape and to provide space for devices within. In another example, the front frame 102 may comprise injection molded plastic. In other implementations, the front frame 102 may comprise several discrete pieces that are joined together by way of mechanical engagement features, welding, adhesive, and so forth.

Figure 2:
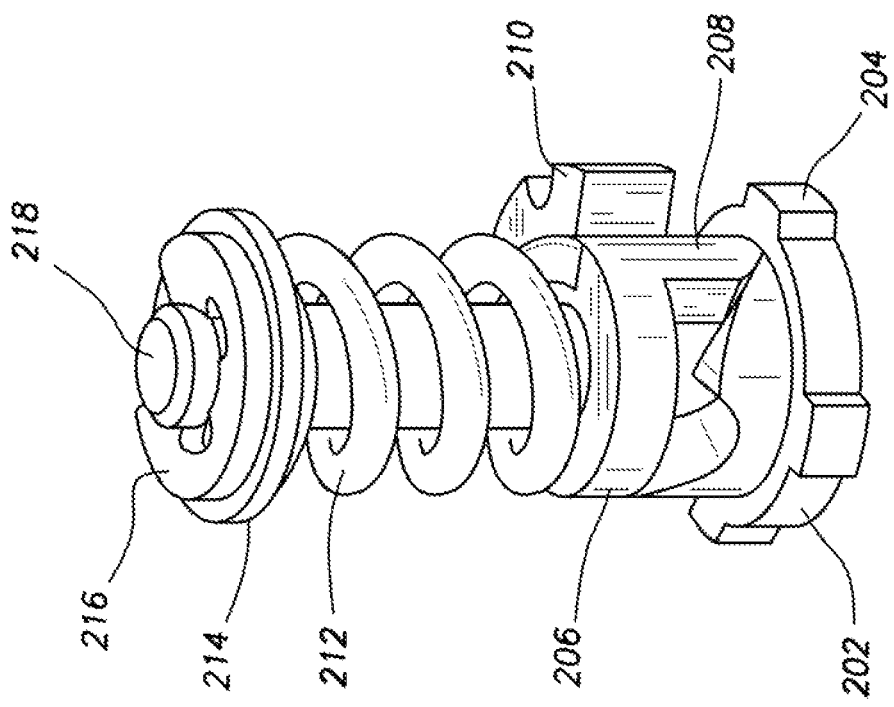
FIG. 2 depicts a view of the cam device, according to some implementations.

FIG. 2 depicts a view of the components of the cam device 110, according to some implementations. A cam 202 is depicted with a plurality of engagement features 204. The cam 202 includes a first surface that includes a particular shape. The engagement features 204 may engage a portion of the hinge 108. For example, the engagement features 204 may engage the complementary engagement features in the fixed arm 112. The cam 202 is described in more detail below with regard to FIG. 3.

Proximate to the cam 202 is a cam follower 206. The cam follower 206 has a second surface and a third surface that is opposite the second surface. The second surface is proximate to the first surface of the cam 202. For example, in this illustration the second surface is the lower surface on the cam follower 206 while the third surface is the upper surface on the cam follower 206. The third surface of the cam follower 206 may be substantially planar or flat. A first protrusion 208 extends from the second surface of the cam follower 206. The first protrusion 208 is in contact with the first surface of the cam 202. A second protrusion 208 (not shown) may extend from the second surface of the cam follower 206 at a position that is opposite the first protrusion 208.

The cam follower 206 may include an engagement feature 210, such as a tooth or ridge that extends from a body of the cam follower 206. The engagement feature 210 may engage a portion of the hinge 108. For example, the engagement feature 210 may engage the complementary engagement features in the moving arm 114.

A biasing mechanism is used to apply a biasing force that urges the cam follower 206 towards the cam 202, such that the first protrusion 208 is urged into contact with the first surface. In this illustration, the biasing mechanism comprises a spring 212, washer 214, retention clip 216, and a post 218. The post 218 has a first end affixed to a center of the cam 202. For example, the first end of the post 218 may be jointed to the cam 202. As a retention washer 214 is affixed to a second end of the post 218 using the retention clip 216. The spring 212 encircles the post 218 and is constrained between the washer 214 and the third surface (upper surface in this illustration) of the cam follower 206.

The spring 212 exerts a force between the retention washer 214 and the second surface of the cam follower 206, such that the first protrusion 208 is urged into contact with the first surface of the cam 202. The spring 212 may comprise a helical compression spring. The cam 202 and the cam follower 206 may rotate with respect to one another with a common axis of rotation that extends through the longitudinal axis of the post 218. During rotation, the protrusion 208 of the cam follower 206 slides along the first surface of the cam 202. As the shape described by the first surface changes, the displacement of the cam follower 206 along the longitudinal axis also changes. For example, if the protrusion 208 slides upward along a curved wall of a recess in the shape, the distance between the body of the cam follower 206 and the cam 202 increases, the distance between the third surface of the cam follower 206 and the washer 214 decreases, and the spring 212 is compressed.

In other implementations, the biasing mechanism may utilize other devices to provide the biasing force. For example, an elastomeric member may be used instead of the spring 212. Continuing the example, a urethane compression spring may be used to provide the biasing force. In another example, one or more magnets may be used to provide the biasing force. Continuing the example, a pair of cylindrical magnets may be placed with opposing magnetic poles facing each other to produce a repulsive force. This repulsive force may be used as the biasing force. Other techniques and other arrangements may be used as well.

A housing (not shown) may be used to enclose a portion of the cam device 110. For example, the housing may extend from near the base of the cam 202 and cover the remainder of the cam device 110. The housing may itself include an engagement feature, such as a protrusion, that engages the engagement feature 210. This engagement feature in the housing may then engage the complementary engagement features in the moving arm 114.

Figure 3:
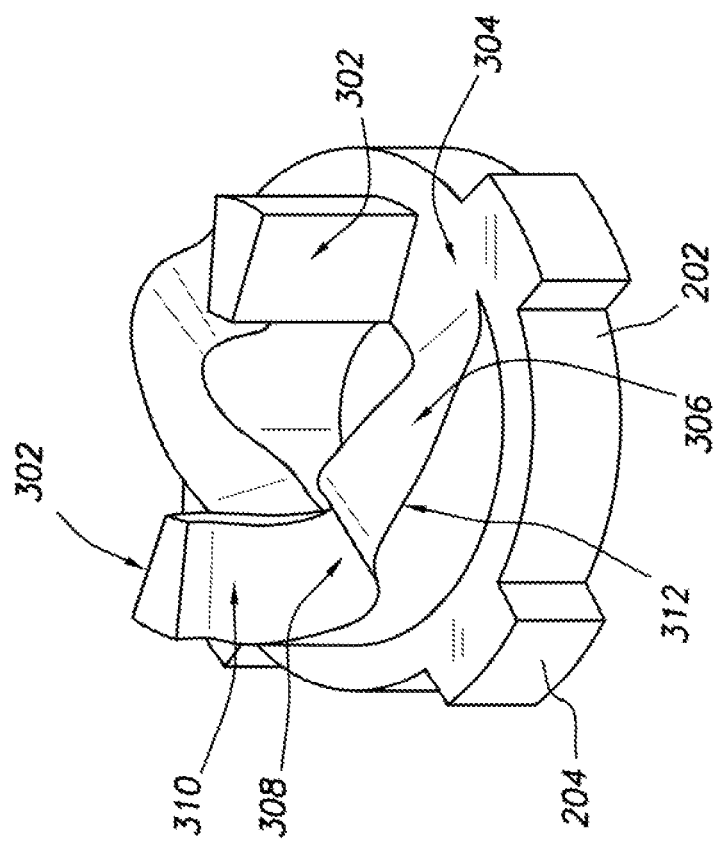
FIG. 3 depicts a view of a cam in the cam device, according to some implementations.

FIG. 3 depicts a view of the cam 202 in the cam device 110, according to some implementations. The first surface of the cam 202, in this illustration the upper surface, exhibits a particular shape.

The relative position and shape of recesses, peaks, stops, curves, and so forth in the shape determines points in the rotation of the cam device 110 at which rotational biasing is applied, and the direction of that biasing. For example, a recess is a point in which the cam device 110 will not produce a bias force that would rotate the hinge 108 in one direction or another. However, as the rotation of the hinge 108 is affected, such as by the outside force of a user moving the temple 104, the curved slope of the sides of the recess acting on the protrusion 208 will exert a rotational force that tends to "snap" the hinge 108 back into the position associated with the protrusion 208 in the recess.

In one implementation, the shape of the cam 202 may be symmetrical across a diameter of the cam 202. For example, if there is a first peak at 0 degrees, there will be a second peak of the same height at 180 degrees, directly opposite the first peak. In this implementation, the cam follower 206 may include a second protrusion 208 that is positioned opposite the first protrusion 208.

In the implementation depicted here, the shape produces biasing in the cam device 110 that results, when installed in the hinge 108, in four possible configurations: closed, transit, neutral, and maximum neutral. The shape includes a first end stop 302. This constrains the rotation between the cam 202 and the cam follower 206 by blocking the protrusion 208.

A first recess 304 produces biasing desired for the closed configuration. In the closed configuration, the hinge 108 is closed and has a tendency to stay in the closed configuration by a biasing force. The first recess 304 may be bounded on a first side by the first end stop 302. The first side of the first end stop 302 may be perpendicular to the first surface of the cam 202. A second side of the first recess 304 comprises a first curve 306 that extends from the first recess 304 to a first peak 312. The first recess 304 may be configured to provide a working angle of 0 degrees. The first peak 312 may be configured to provide a working angle of 80 degrees.

The portion of the shape that is described by the first curve 306 produces the biasing desired for the transit configuration. As the protrusion 208 slides along the surface from the first recess 304 and up along the first curve 306, due to the force of the spring 212, the protrusion 208 is urged "downhill" towards the first recess 304. This provides a biasing force to rotate the cam device 110 and thus the hinge 108 such that the temple 104 returns to the closed configuration. However, as external force is applied, such as by the user, the temple 104 may be moved past the first peak 312.

A second recess 308 is bounded on a first side by a second curve extending from the first peak 312 and on a second side by a third curve 310 extending to a second end stop 302. The second recess 308 produces the biasing desired for the neutral configuration. After the protrusion 208 has moved past the first peak 312, the cam follower 206 resists this motion as the protrusion 208 is again urged "downhill" towards the second recess 308. This provides a biasing force to rotate the cam device 110 and thus the hinge 108 such that the temple 104 returns to the neutral configuration. The second recess 308 may be configured to provide a working angle of 95 degrees.

The portion of the shape that is described by the third curve 310 produces the biasing desired for the maximum neutral configuration. As the protrusion 208 slides along the surface from the second recess 308 and up along the third curve 310, due to the force of the spring 212, the cam follower 206 resists this motion as the protrusion 208 is urged "downhill" towards the second recess 308. This provides a biasing force to rotate the cam device 110 and thus the hinge 108 such that the temple 104 returns to the neutral configuration. However, as external force is applied, such as by the user, the temple 104 may be moved past the neutral configuration and to a maximum neutral configuration that is ultimately limited when the protrusion 208 encounters a second end stop 302. The first end stop 302 and the second end stop 302 thus serve to constrain total rotation of the cam device 110 and thus of the hinge 108.

A depth of the second recess 308 may be less than a depth of the first recess 304. This difference in depth results in different frictional effects on the protrusion 208 in the different recesses. For example, there may be less friction to move the protrusion 208 out of the first recess 304 as a result of the spring 212 being compressed less than when the protrusion 208 is within the second recess 308. By adjusting the depth of the recess, the desired degree of force may be obtained. Likewise, by adjusting the height of the curves, particular amounts of biasing force may be applied. For example, based on the spring constant of the spring 212, the height of the features in the shape may be adjusted such that the spring 212 or other biasing mechanism produces between 0.3 newtons (N) and 0.6 N of force on the cam follower 206 when the first protrusion 208 is within the first recess 304 and between 0.8 N and 1.1 N of force on the cam follower 206 when the first protrusion 208 is proximate to the second end stop 302.

Figure 4A:
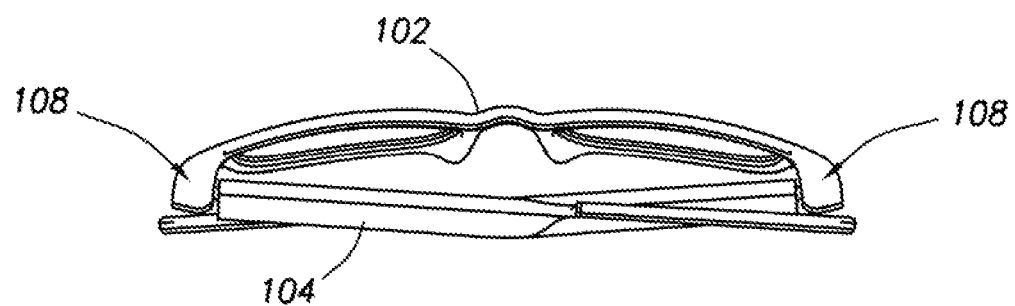
FIG. 4A depicts a head-mounted wearable device (HMWD) that may use the hinge and cam device with the temples in a closed configuration, according to some implementations.

FIG. 4A depicts a HMWD that may use the hinge 108 and cam device 110 with the temples 104 in a closed configuration, according to some implementations. In this configuration a long axis of each temple 104 is approximately parallel to a long axis of the front frame 102. The cam device 110 provides a biasing on the hinge 108 and attached temple 104 due to the interaction of the protrusion 208 with the first recess 304. In this example, the biasing is such that the temple 104 tends to resist being moved from the closed configuration.

Figure 4B:
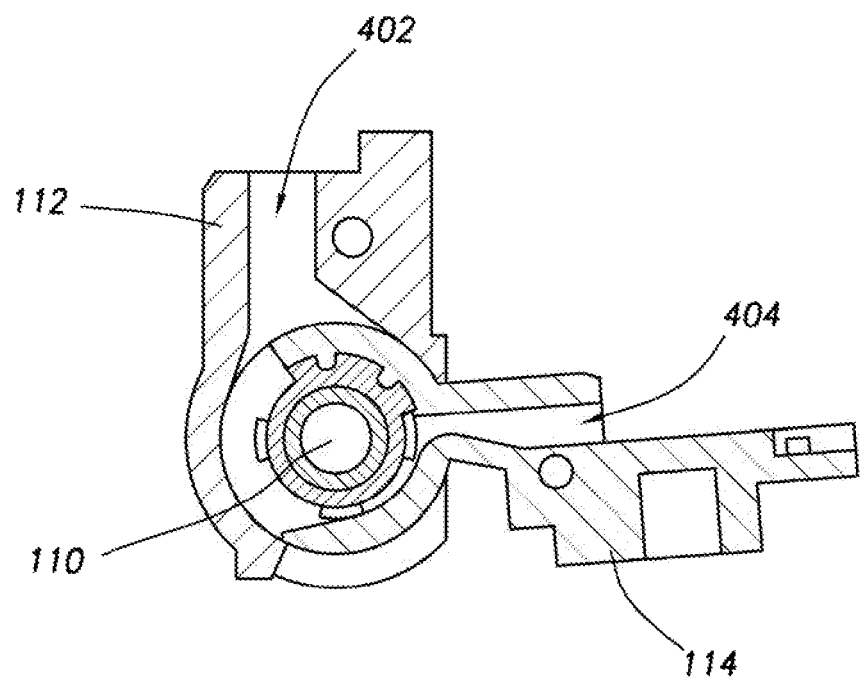
FIG. 4B depicts a cross sectional view of the hinge while in the closed configuration, according to some implementations.

FIG. 4B depicts a cross sectional view of the hinge 108 while in the closed configuration, according to some implementations. In this illustration the fixed arm 112 and the moving arm 114 form an angle of approximately 90 degrees. A first channel 402 is shown in the fixed arm 112, through which a first portion of the FPC 106 may pass. A second channel 404 is shown in the moving arm 114, through which a second portion of the FPC 106 may pass. The cam device 110 is shown, installed along an axis of rotation of the hinge 108.

The structure of the fixed arm 112 may be configured to constrain rotation to a minimum value before the protrusion 208 comes into contact with the first end stop 302. For example, a portion of the moving arm 114 may come into contact with a portion of the fixed arm 112, preventing further rotation. This constraint may be implemented to prevent damage to the cam device 110 due to excessive rotation, such as while putting the HMWD into the closed configuration.

Figure 5A:
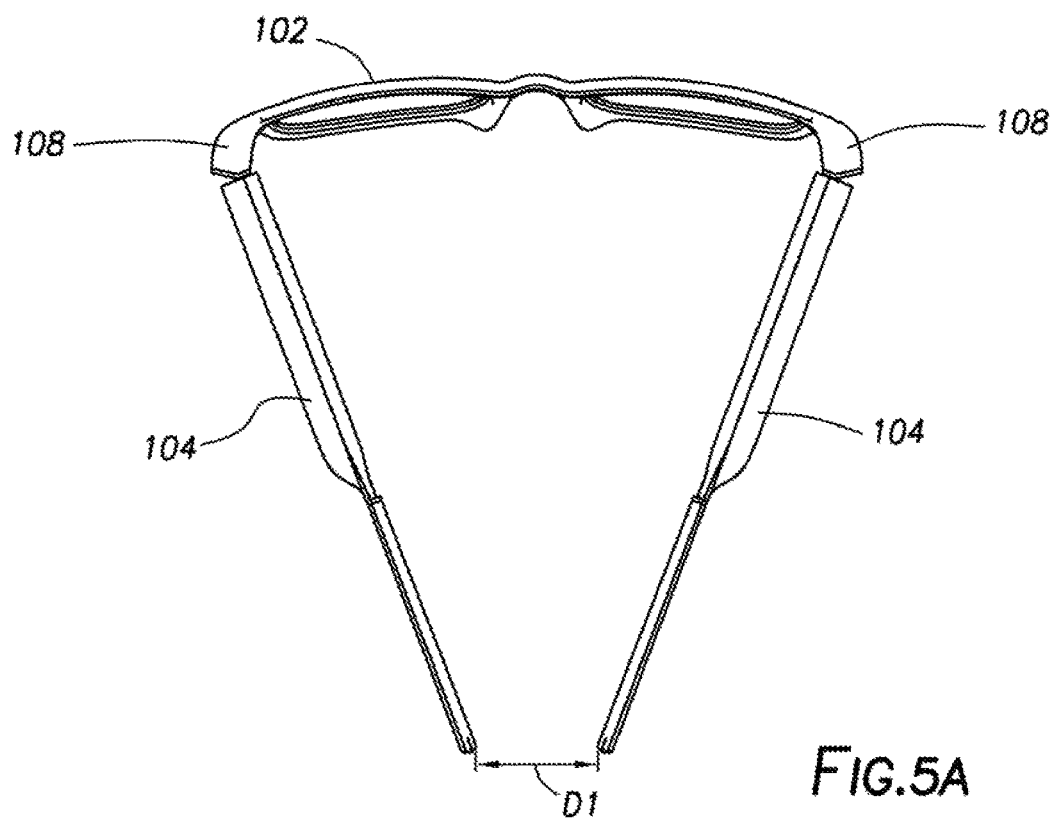
FIG. 5A depicts the HMWD that may use the hinge and cam device with the temples in a transit configuration, according to some implementations.

FIG. 5A depicts a HMWD that may use the hinge 108 and cam device 110 with the temples 104 in a transit configuration, according to some implementations. In this configuration a long axis of each temple 104 is at an angle between that of the neutral configuration and the closed configuration. The cam device 110 provides a biasing on the hinge 108 and attached temple 104 due to the interaction of the protrusion 208 with the first curve 306. In this example, the biasing is such that the temple 104 tends to move towards the closed configuration.

Figure 5B:
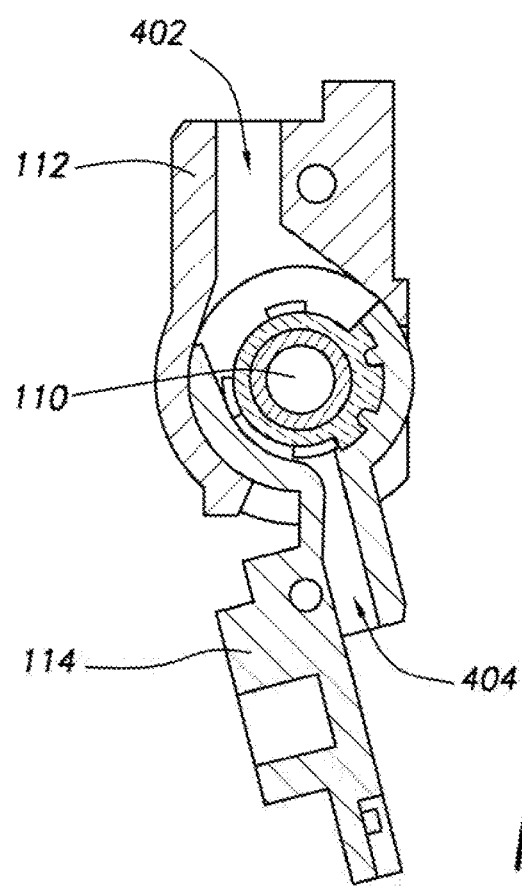
FIG. 5B depicts a cross sectional view of the hinge while in the transit configuration, according to some implementations.

FIG. 5B depicts a cross sectional view of the hinge 108 at a point in the transit configuration, according to some implementations. In this illustration the fixed arm 112 and the moving arm 114 form an angle of approximately 75 degrees. The first channel 402 is shown in the fixed arm 112, through which the first portion of the FPC 106 may pass. The second channel 404 is shown in the moving arm 114, through which the second portion of the FPC 106 may pass. The cam device 110 is shown, installed along the axis of rotation of the hinge 108.

Figure 6A:
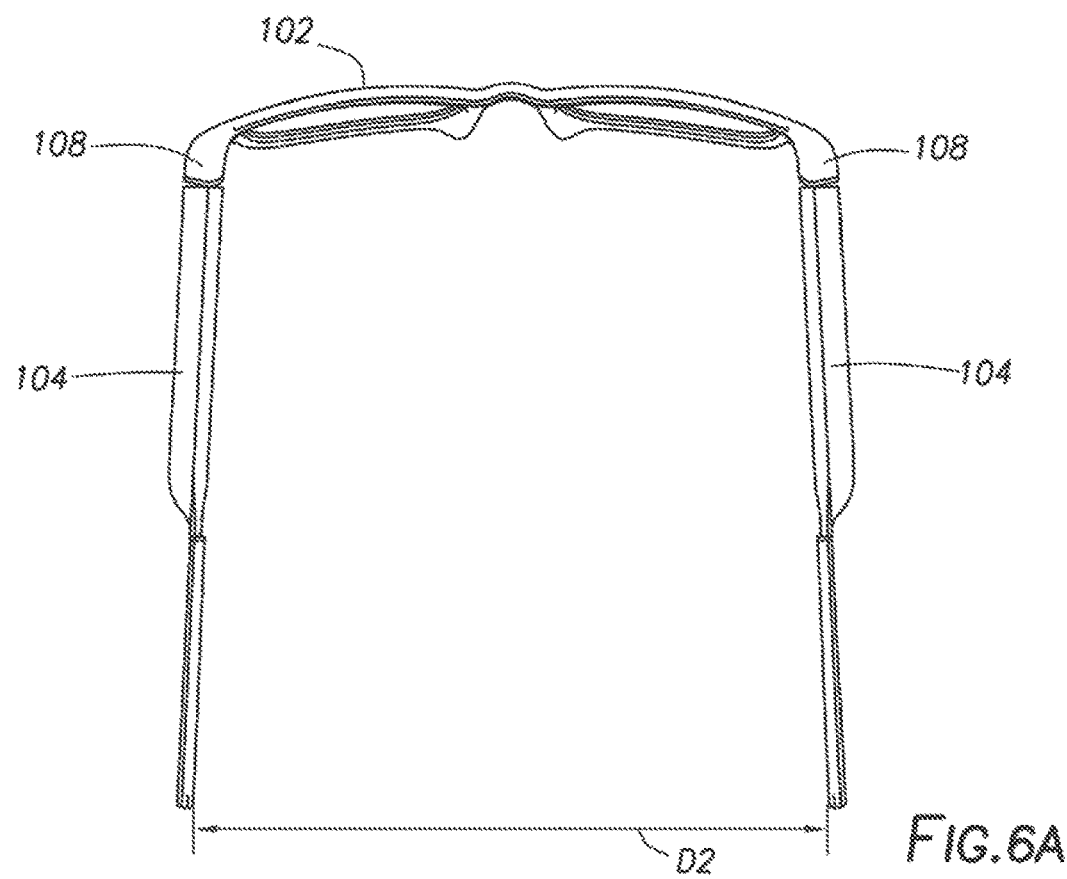
FIG. 6A depicts the HMWD that may use the hinge and cam device with the temples in a neutral configuration, according to some implementations.

FIG. 6A depicts a HMWD that may use the hinge 108 and cam device 110 with the temples 104 in a neutral configuration, according to some implementations. In this configuration a long axis of each temple 104 forms an angle that is approximately 90 degrees with respect to a long axis of the front frame 102. The cam device 110 provides a biasing on the hinge 108 and attached temple 104 due to the interaction of the protrusion 208 with the second recess 308. In this example, the biasing is such that the temple 104 tends to remain in the neutral configuration.

Figure 6B:
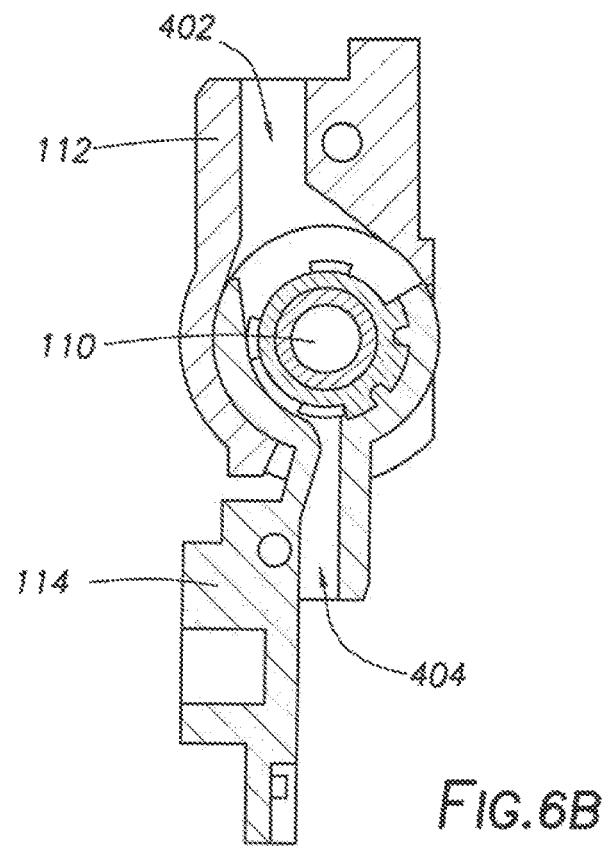
FIG. 6B depicts a cross sectional view of the hinge while in the neutral configuration, according to some implementations.

FIG. 6B depicts a cross sectional view of the hinge 108 at a point in the neutral configuration, according to some implementations. In this illustration the fixed arm 112 and the moving arm 114 form an angle of approximately 180 degrees. The first channel 402 is shown in the fixed arm 112, through which the first portion of the FPC 106 may pass. The second channel 404 is shown in the moving arm 114, through which the second portion of the FPC 106 may pass. The cam device 110 is shown, installed along the axis of rotation of the hinge 108.

Figure 7A:
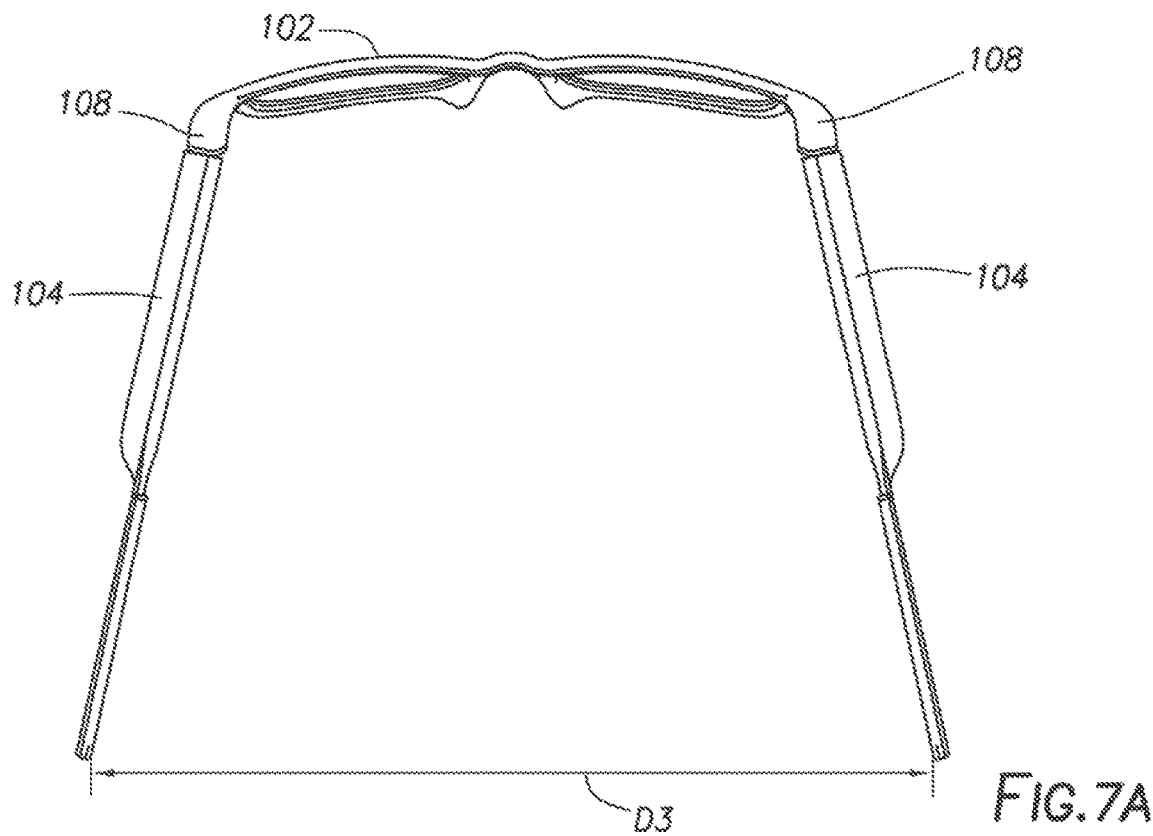
FIG. 7A depicts the HMWD that may use the hinge and cam device with the temples in a maximum neutral configuration, according to some implementations.

FIG. 7A depicts a HMWD that may use the hinge 108 and cam device 110 with the temples 104 in a maximum neutral configuration, according to some implementations. In this configuration a long axis of each temple 104 forms an angle that is more than 90 degrees with respect to a long axis of the front frame 102. The cam device 110 provides a biasing on the hinge 108 and attached temple 104 due to the interaction of the protrusion 208 with the third curve 310. In this example, the biasing is such that the temple 104 tends to move towards the neutral configuration.

Figure 7B:
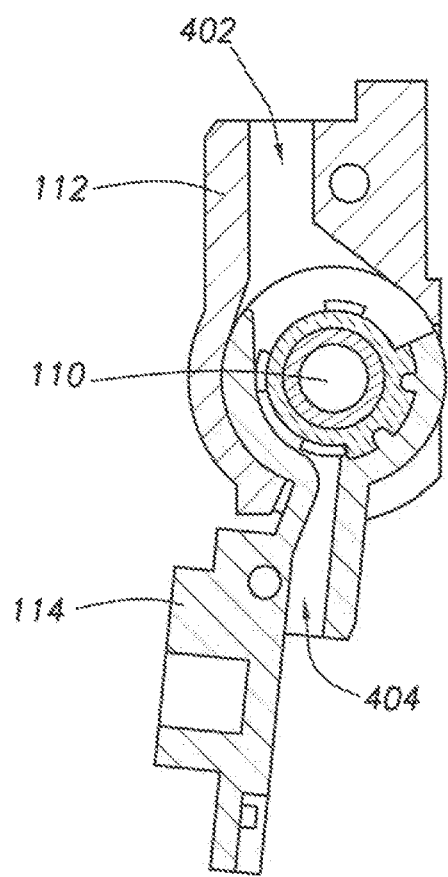
FIG. 7B depicts a cross sectional view of the hinge while in the maximum neutral configuration, according to some implementations.

FIG. 7B depicts a cross sectional view of the hinge 108 at a point in the maximum neutral configuration, according to some implementations. In this illustration the fixed arm 112 and the moving arm 114 form an angle of approximately 190 degrees. The first channel 402 is shown in the fixed arm 112, through which the first portion of the FPC 106 may pass. The second channel 404 is shown in the moving arm 114, through which the second portion of the FPC 106 may pass. The cam device 110 is shown, installed along the axis of rotation of the hinge 108.

The structure of the fixed arm 112 may be configured to constrain rotation to a maximum value before the protrusion 208 comes into contact with the second end stop 302. For example, a portion of the moving arm 114 may come into contact with a portion of the fixed arm 112, preventing further rotation. This constraint may be implemented to prevent damage to the cam device 110 due to excessive rotation.

FIG. 8A depicts a cross sectional view of the hinge 108 while in the closed configuration showing the path of the FPC 106 through the hinge 108, according to some implementations. The FPC 106 in this implementation passes through the first channel 402, through a volume 802 within the hinge 108 passing around an outer perimeter of the cam device 110, and through the second channel 404. As described above, the cam device 110 may include a housing. This housing maintains separation between the FPC 106 and the internal components of the cam device 110, such as the spring 212.

FIG. 8B depicts a cross sectional view of the hinge 108 while in the neutral configuration showing the path of the FPC 106 through the hinge 108, according to some implementations. As with FIG. 8A, the FPC 106 in this implementation passes through the first channel 402, through a volume 802 within the hinge 108, and through the second channel 404. As illustrated, a now-excess length of FPC 106 is stowed in a serpentine arrangement 804 within a second volume 806 that is within the fixed arm 112. For example, the first channel 402 within the fixed arm 112 may have a larger volume 806 than the second channel 404 within the moving arm 114. This second volume 806 in the fixed arm 112 provides space for the excess length of FPC 106 to reside while the hinge 108 is in the neutral configuration. In the event that the hinge 108 is moved into the open maximum configuration, the excess length of FPC 106 is withdrawn from the second volume 806. Likewise, as the hinge 108 moves to the transit configuration and then the closed configuration, some length of FPC 106 is withdrawn from the second volume 806.

While four configurations are depicted above, it is understood that other configurations may be used. For example, the cam 202 may have the shape configured to provide only the closed configuration and the maximum neutral configuration.

Figure 9A:
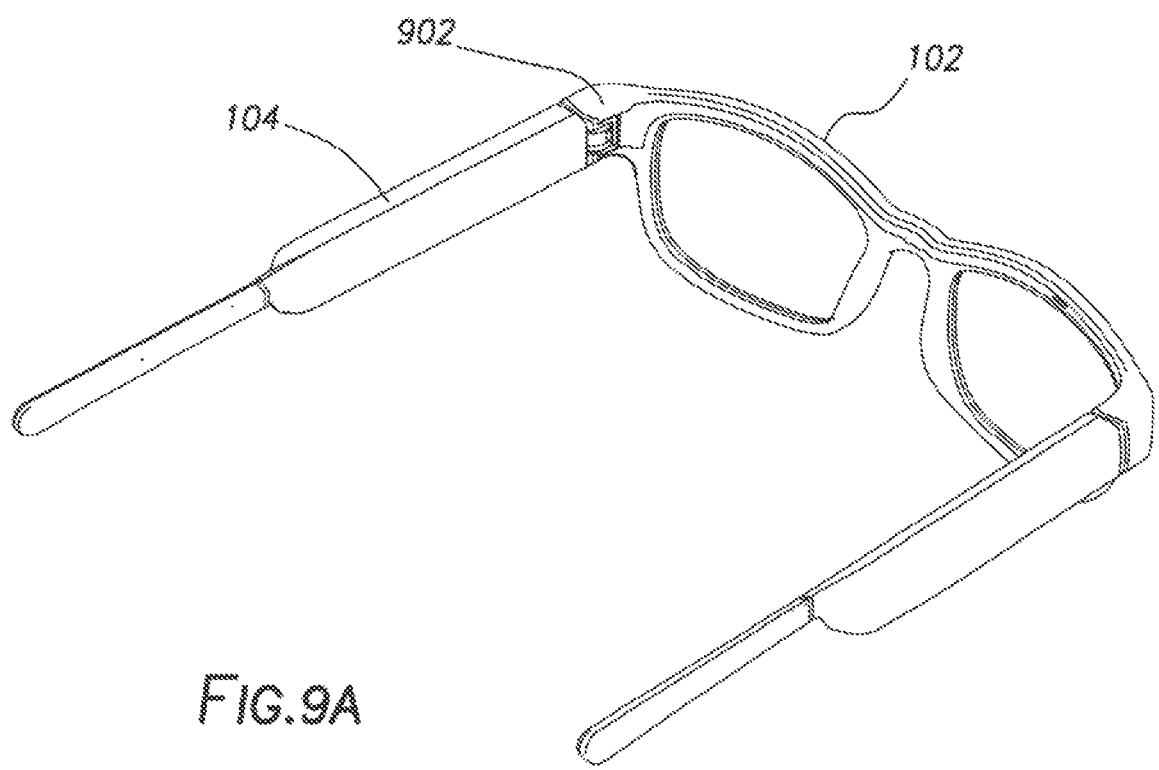
FIG. 9A depicts an exterior view of a HMWD with another implementation of a hinge, according to some implementations.

FIG. 9A depicts an exterior view of a HMWD with another implementation of a hinge, according to some implementations.

Shown is the front frame 102 and the temple 104. The temples 104 are joined to the front frame 102 by a hinge 902. The temples 104 are in the neutral configuration, such as experienced during normal wear.

Figure 9B:
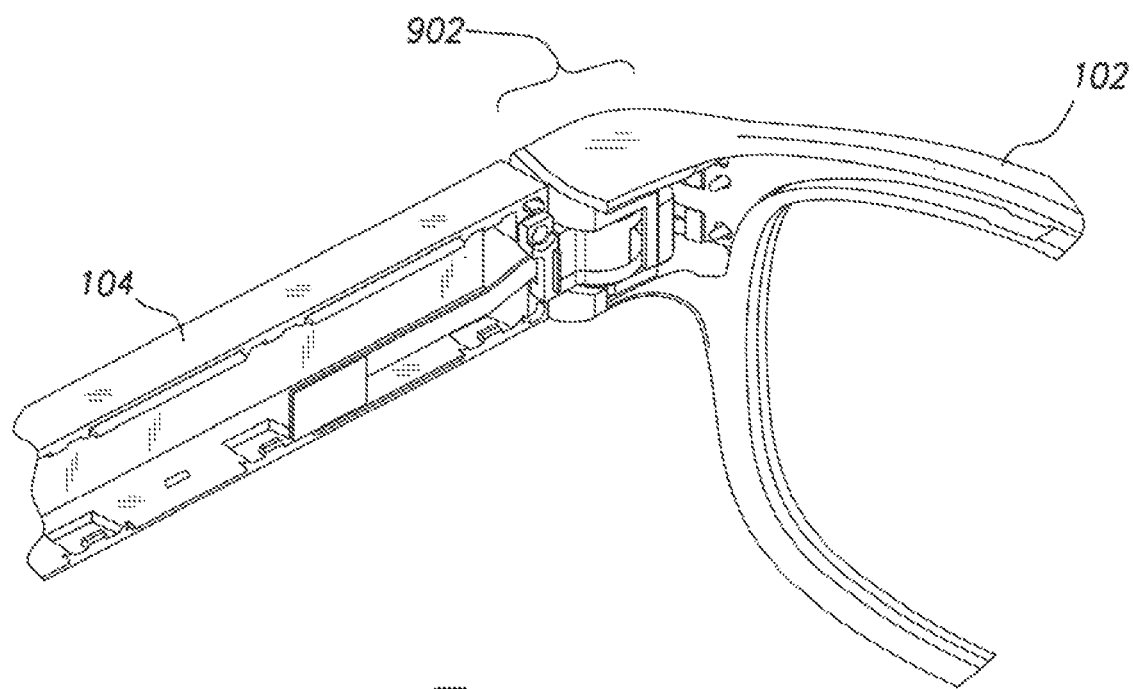
FIG. 9B depicts an enlarged view with some internal details of the hinge of FIG. 9A, according to some implementations.

FIG. 9B depicts an enlarged view with some internal details of the hinge 902 of FIG. 9A, according to some implementations. In this illustration the hinge 902 is shown with the FPC 106 passing through the hinge 902 from the front frame 102 to the temple 104.

Figure 9C:
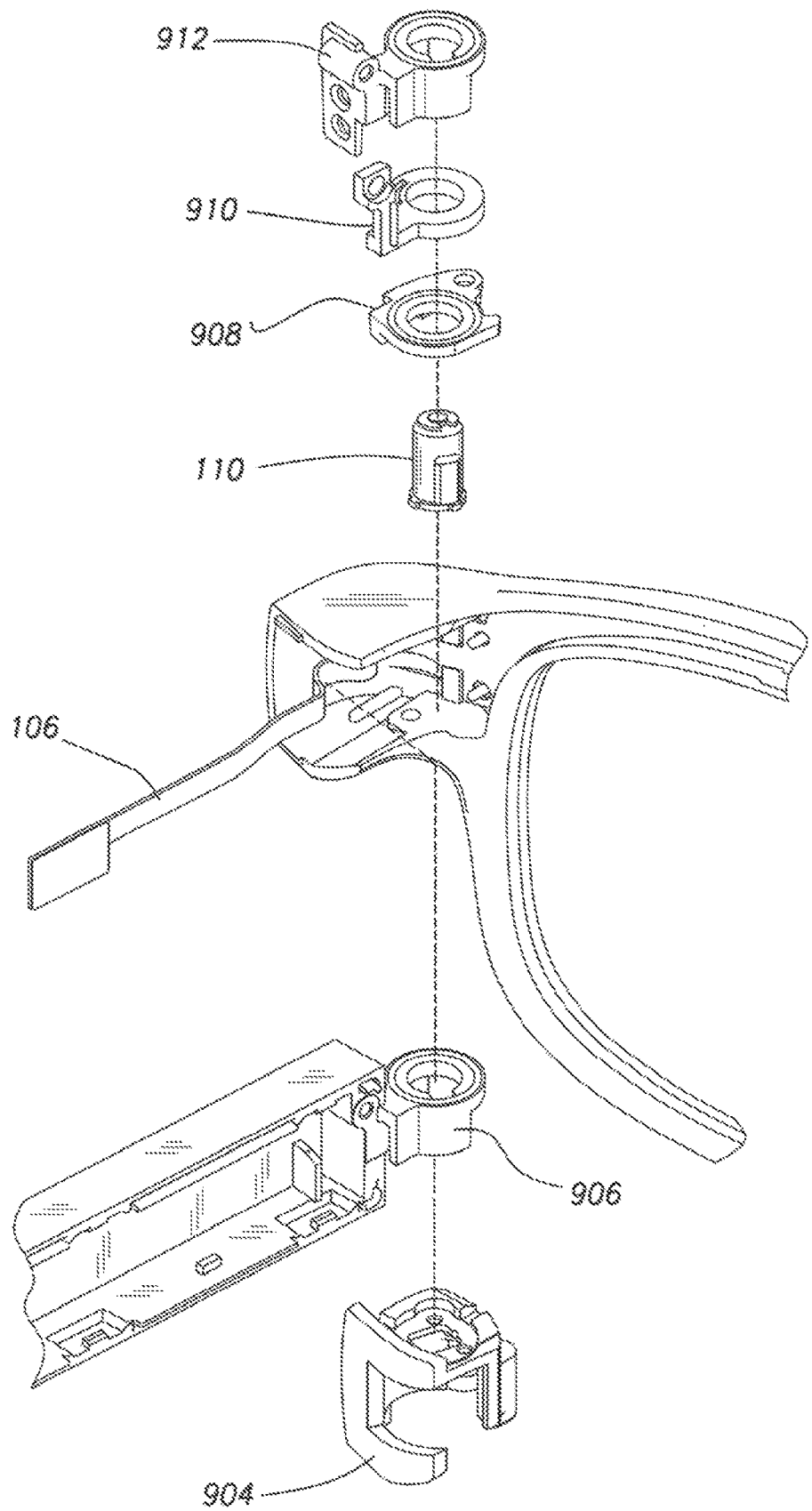
FIG. 9C depicts an exploded view of the hinge of FIG. 9A, according to some implementations.

FIG. 9C depicts an exploded view of the hinge 902 of FIG. 9A, according to some implementations. The hinge 902 may comprise a fixed arm 904. The fixed arm 904 is joined to the front frame 102. In other implementations, the fixed arm 904 may comprise an integral part of the front frame 102. The fixed arm 904 may include one or more engagement features that mechanically engage a first portion of the cam device 110. Once engaged, the fixed arm 904 and the first portion of the cam device 110 will move in unison.

The hinge 902 may comprise a moving arm 906. The moving arm 906 is at least partially enclosed by the fixed arm 904. The fixed arm 904 is joined to the temple 104. In other implementations, the fixed arm 904 may comprise an integral part of the temple 104. The moving arm 906 may include one or more engagement features that mechanically engage a second portion of the cam device 110. Once engaged, the moving arm 906 and the second portion of the cam device 110 will move in unison.

The hinge 902 may include a fixed cover 908. The fixed cover 908 may join to the fixed arm 904 to enclose the cam device 110 after insertion of the cam device 110.

The hinge 902 may include a moving cover that comprises a first piece 910 and a second piece 912. One or both of the first piece 910 and the second piece 912 may join to one or more of the temple 104 or the moving arm 906. The moving cover may retain the cam device 110 within the hinge 902.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a front frame;
a first temple;
a first flexible printed circuit; and a first hinge that joins the front frame and the first temple, wherein the first hinge comprises:
   a moving hinge assembly affixed to the first temple;
   a fixed hinge assembly that encloses at least a portion of the moving hinge assembly and is affixed to the front frame; and
   a cam device arranged at a rotation point between the moving hinge assembly and the fixed hinge assembly;
wherein the moving hinge assembly comprises:
   a first channel through which a first portion of the first flexible printed circuit passes from the first temple to the fixed hinge assembly, and
   a first engagement feature;
wherein the fixed hinge assembly comprises:
   a second channel through which a second portion of the first flexible printed circuit passes to the front frame, and
   a second engagement feature; and
wherein the cam device comprises:
   a cam comprising:
     a first surface having a first shape comprising:
       a first stop having a first height,
       a first recess with a first depth,
       a second recess having a second depth, and
       a second stop having the first height; and
     a third engagement feature that engages the first engagement feature such that the moving hinge assembly and at least a portion of the cam rotate in unison;
   a cam follower comprising:
     a second surface;
     a third surface opposite the second surface, wherein the second surface is proximate to the first surface of the cam;
     a first protrusion extending from the second surface, wherein the first protrusion is in contact with the first surface; and
     a fourth engagement feature that engages the second engagement feature such that the fixed hinge assembly and at least a portion of the cam follower rotate in unison;
   a post having a first end affixed to a center of the cam;
   a retention washer affixed to a second end of the post; and
   a helical spring that exerts a force between the retention washer and the second surface of the cam follower, such that the first protrusion is urged into contact with the first surface.

2. The head-mounted wearable device of claim 1, wherein the first shape extends along a first half of the first surface, the cam further comprising a second shape that extends along a second half of the first surface, wherein the second shape is a mirror image of the first shape; and
   the cam follower further comprises a second protrusion arranged at a location on a perimeter of the cam follower that is opposite a location of the first protrusion, wherein the second protrusion extends from the second surface to contact the first surface.

3. The head-mounted wearable device of claim 1, wherein:
the first stop is adjacent to the first recess,
the first recess is at a first position along a perimeter of the cam,
the second recess is at a second position along the perimeter of the cam,
a first portion of the first shape extends from the first recess to the second recess, the first portion including:
   a first concave curve that transitions from a bottom of the first recess to a first peak having a second height, and
   a second concave curve that transitions from the first peak to a bottom of the second recess, and
a second portion of the first shape extends from the second recess to the second stop, the second portion including
   a third concave curve that transitions from a bottom of the second recess to the second stop.

4. A device comprising:
a cam device comprising a cam, a cam follower, and a biasing mechanism, wherein the cam comprises:
   a first engagement feature; and
   a first surface having a first shape comprising:
     a first stop,
     a first recess having a first depth,
     a second recess having a second depth, wherein the first depth is greater than the second depth, and
     a second stop;
wherein the cam follower comprises:
   a second surface;
   a third surface that is proximate to the first surface of the cam;
   a first protrusion extending from the second surface, wherein the first protrusion is in contact with the first surface; and
   a second engagement feature; and
wherein the biasing mechanism applies a force that urges the cam follower toward the cam to urge the first protrusion into contact with the first surface.

5. The device of claim 4, wherein the first shape is arranged along a first half of a perimeter of the cam; and
   the first surface further comprises a second shape that is arranged along a second half of the perimeter of the cam, and wherein the second shape is symmetrical with the first shape.

6. The device of claim 4, wherein:
the cam includes a base;
the first stop is adjacent to the first recess and has a fourth surface perpendicular to the base for constraining movement of the first protrusion of the cam follower;
the first recess is at a first position along a perimeter of the cam;
the second recess is at a second position along the perimeter of the cam;
a first portion of the first shape extends from the first recess to the second recess, the first portion comprising:
   a first concave curve from a bottom of the first recess to a first peak having a first height, and
   a second concave curve from the first peak to a bottom of the second recess; and
a second portion of the first shape comprises a third concave curve from the bottom of the second recess to the second stop.

7. The device of claim 4, wherein the first protrusion slides along the first surface, and rotation between the cam and the cam follower is constrained by contact between the first protrusion and one or more of the first stop or the second stop.

8. The device of claim 4, wherein the biasing mechanism comprises:
   a post that passes through a center of the cam and a center of the cam follower;
   a first retention clip affixed to a first end of the post;

a second retention clip affixed to a second end of the post; and
a helical spring arranged between the first retention clip and the second surface of the cam follower, wherein the helical spring exerts pressure on the second surface.

9. The device of claim 4, wherein the biasing mechanism comprises:
a post that passes through a center of the cam and a center of the cam follower, wherein:
a first end of the post is affixed to the cam, and
a second end of the post extends toward the cam follower; and
an elastomeric member affixed to the second end of the post, wherein the elastomeric member is in contact with the third surface of the cam follower, and wherein the elastomeric member exerts pressure on the third surface.

10. The device of claim 4, further comprising:
a first hinge portion engaged with the cam device and having a first end, a second end, and a first channel extending from the first end to the second end, wherein the first hinge portion further comprises:
a first opening into which at least a portion of the cam device fits; and
a third engagement feature that engages one or more of the first engagement feature or the second engagement feature;
wherein a flexible printed circuit extends through the first channel and around an outer radius of the cam device.

11. The device of claim 10, further comprising:
a second hinge portion engaged with the cam device and having a third end, a fourth end, and a second channel extending from the third end to the fourth end, wherein the second hinge portion further comprises:
a second opening into which at least a portion of the cam device fits; and
a fourth engagement feature that engages one or more of the first engagement feature or the second engagement feature;
wherein the cam device is within the first opening and the second opening, and the flexible printed circuit further extends through the second channel.

12. The device of claim 11, wherein the first channel comprises a larger volume than the second channel, a first portion of the flexible printed circuit is positioned in the first channel, a second portion of the flexible printed circuit is positioned in the second channel, and the first portion of the flexible printed circuit is larger than the second portion of the flexible printed circuit.

13. The device of claim 4, further comprising:
a first hinge portion engaged with the cam device;
a second hinge portion engaged with the cam device;
a first temple that is joined to the first hinge portion;
first electronics located within the first temple;
a front frame that is joined to the second hinge portion; and
second electronics located within the front frame;
wherein a flexible printed circuit connects the first electronics and the second electronics.

14. A device comprising:
a hinge; and
a cam device comprising: a cam, a cam follower, and a biasing mechanism;
wherein the cam comprises:
a first surface having a first shape comprising a first stop and at least one curve;

wherein the cam follower comprises:
a second surface;
a third surface that is proximate to the first surface of the cam; and
a first protrusion extending from the second surface, wherein the first protrusion is in contact with the first surface;
wherein the biasing mechanism comprises:
a post that passes through a center of the cam and a center of the cam follower, the post including:
a first feature at a first end of the post that constrains motion of the cam; and
a second feature at a second end of the post that constrains motion of the cam follower; and
a spring arranged between the first feature and the second surface of the cam follower, wherein the spring exerts pressure on the second surface that urges the cam follower toward the cam to urge the first protrusion toward contact with the first surface; and
wherein the hinge comprises:
a first hinge portion having: a first end, a second end, a first channel extending from the first end of the first hinge portion to the second end of the first hinge portion, a first opening into which at least a portion of the cam device fits, and an engagement feature that engages the first hinge portion to at least a portion of the cam; and
a flexible printed circuit comprising a first portion within the first channel, wherein the flexible printed circuit extends around an outer radius of the cam device.

15. The device of claim 14, wherein:
the second end of the first hinge portion is proximate to an axis of rotation of the cam device,
the first hinge portion is affixed to the cam to enable the cam and the first hinge portion to move in unison, and
the device further comprises:
a second hinge portion having a third end, a fourth end, and a second channel extending from the third end to the fourth end, wherein:
the first channel has a first volume that is greater than a second volume of the second channel,
the first portion of the flexible printed circuit is positioned in the first channel,
a second portion of the flexible printed circuit is positioned in the second channel,
the first portion is larger than the second portion, and
the second hinge portion is affixed to the cam to enable the cam and the second hinge portion to move in unison.

16. The device of claim 14, wherein the hinge further comprises a second hinge portion, the device further comprising:
a first temple that is joined to the first hinge portion;
first electronics located within the first temple;
a front frame that is joined to the second hinge portion; and
second electronics located within the front frame;
wherein the flexible printed circuit connects the first electronics and the second electronics.

17. The device of claim 16, wherein the first shape of the first surface provides for one of four configurations that include:
a closed configuration in which the hinge is biased to remain at a first angle unless an external force is applied to the first temple;

a transit configuration in which the hinge is biased toward the closed configuration when an angle of the hinge is greater than the first angle and less than a second angle;

a neutral configuration in which the hinge is biased to remain at a third angle unless an external force is applied to the first temple; and a maximum neutral configuration in which the hinge is biased toward the neutral configuration when the angle of the hinge is greater than the third angle.

18. The device of claim 14, wherein the first shape further comprises:

a first recess bounded on a first side by the first stop and on a second side by a first curve extending from the first recess to a first peak, wherein the first stop extends outward from the first surface toward the second surface of the cam follower;

a second recess bounded on a first side by a second curve extending from the first peak and bounded on a second side by a third curve extending to a second stop, wherein the second stop extends outward from the first surface toward the second surface of the cam follower; and wherein a depth of the first recess is greater than a depth of the second recess.

19. The device of claim 14, wherein:

the first shape is arranged along a first half of a perimeter of the cam;

the first protrusion is in contact with the first surface in the first half of the perimeter;

the first surface further comprises a second shape that is arranged along a second half of the perimeter of the cam, wherein the second shape is symmetrical with the first shape;

the cam follower further comprises a second protrusion extending from the second surface; and the second protrusion is in contact with the first surface in the second half of the perimeter.

20. A device comprising:

a hinge; and a cam device;

wherein the cam device comprises:

a cam comprising a first surface having a first shape that includes a first stop and at least one curve;

a cam follower comprising a second surface, a third surface that is proximate to the first surface, and a first protrusion extending from the second surface toward the first surface; and a biasing mechanism that applies a force to urge the cam follower toward the cam and to urge the first protrusion toward the first surface; and wherein the hinge comprises:

a first hinge portion having: a first end, a second end, a first channel extending from the first end to the second end, a first opening into which at least a portion of the cam device fits, and an engagement feature that engages the first hinge portion to at least a portion of the cam, wherein the first hinge portion is affixed to the cam to enable the cam and the first hinge portion to move in unison;

a second hinge portion having a third end, a fourth end, and a second channel extending from the third end to the fourth end, wherein the second end of the first hinge portion is proximate to an axis of rotation of the cam device, the second hinge portion is affixed to the cam to enable the cam and the second hinge portion to move in unison, and the first channel has a first volume that is greater than a second volume of the second channel; and a flexible printed circuit comprising a first portion within the first channel, wherein the flexible printed circuit extends around an outer radius of the cam device, the first portion of the flexible printed circuit is positioned in the first channel, a second portion of the flexible printed circuit is positioned in the second channel, and the first portion is larger than the second portion.

* * * * *